United States Patent [19]

Naito et al.

[11] Patent Number: 4,681,406
[45] Date of Patent: Jul. 21, 1987

[54] ZOOM LENS ASSEMBLY

[75] Inventors: Hideshi Naito; Yoshiro Kodaka, both of Tokyo; Yoshiharu Shiokama, Kawasaki, all of Japan

[73] Assignee: Nippon Kogaku K. K., Tokyo, Japan

[21] Appl. No.: 692,195

[22] Filed: Jan. 17, 1985

[30] Foreign Application Priority Data

Jan. 20, 1984 [JP] Japan ............................. 59-8126

[51] Int. Cl.$^4$ ............................................. G02B 7/10
[52] U.S. Cl. ............................................. 350/429
[58] Field of Search ................................... 350/429

[56] References Cited

U.S. PATENT DOCUMENTS

| | | | |
|---|---|---|---|
| 3,915,557 | 10/1975 | Shimojima | 350/429 |
| 4,275,952 | 6/1981 | Uesugi | 350/429 |
| 4,472,032 | 9/1984 | Kamata et al. | 350/429 |

Primary Examiner—John K. Corbin
Assistant Examiner—Loha Ben
Attorney, Agent, or Firm—Shapiro and Shapiro

[57] ABSTRACT

A zoom lens assembly comprises an optical system containing lens units arranged on the optical axis, a stationary cylindrical member, and an operation member movable relative to the stationary cylindrical member. The operation member is moved in the direction along the optical axis for zooming and is rotated about the optical axis for focusing. The zoom lens assembly further comprises a lens holder axially movable relative to the stationary cylindrical member and holding a certain lens unit selected from the lens units and a cam member mounted axially movable along the optical axis and rotatable about the optical axis relative to the stationary cylindrical member. The cam member is disposed between the operation member and the lens holder and has a cam connection so formed that when the cam member is rotated about the optical axis, the lens holder is moved in the direction along the optical axis and when the cam member is axially moved, the lens holder is moved together with the cam member in the direction along the optical axis. The zoom lens assembly further comprises interlocking elements for rotating the cam member about the optical axis during the time of the operation member being moved in the direction along the optical axis and for moving the cam member in the direction along the optical axis during the time of the operation member being rotated about the optical axis.

10 Claims, 7 Drawing Figures

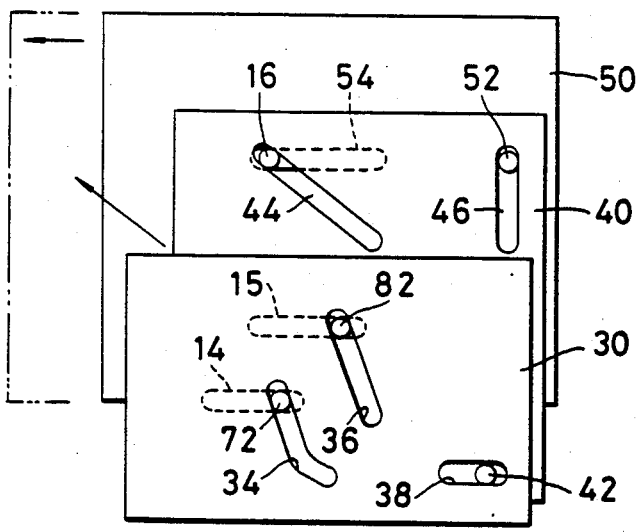
FIG. 5A
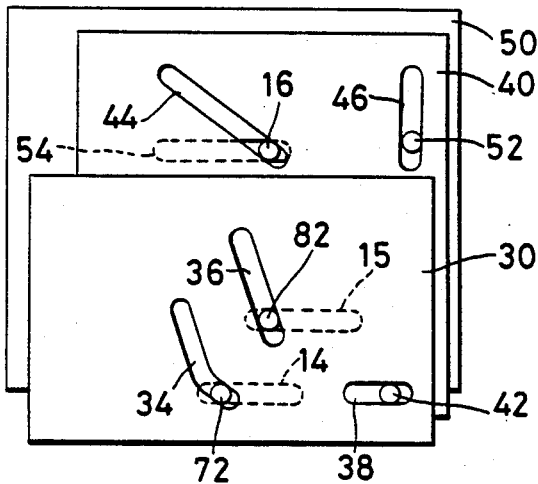
FIG. 5B
FIG. 6
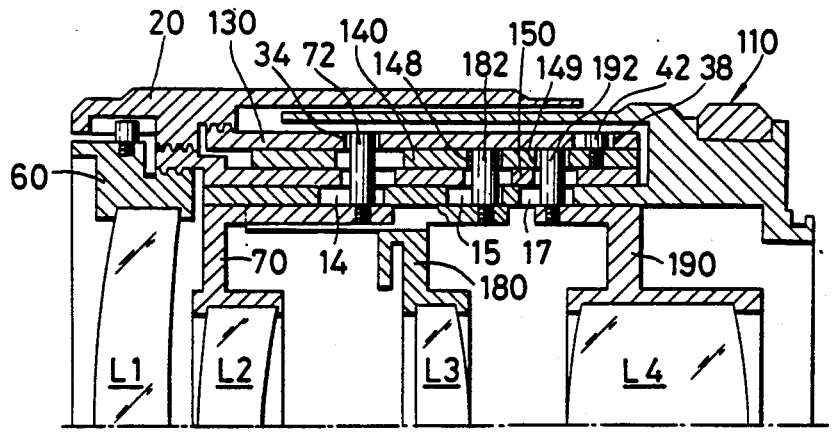

ZOOM LENS ASSEMBLY

BACKGROUND OF THE INVENTION

1. Field of the Invention

The present invention relates to a zoom lens assembly and more particularly a zoom lens assembly provided with an improved focusing mechanism.

2. Description of the Prior Art

U.S. Pat. No. 4,439,019 issued on Mar. 27, 1984 disclosed a zoom lens provided with a focusing ring and a zooming ring in which continuous focusing from infinity to nearest object distance is possible by an operation for rotating the focusing ring. This prior art zoom lens has advantages of simple construction and easy operation. In order to maintain the optical performance of the lens during focusing the focusing lens group is moved as a whole while changing the separation between lens elements of the focusing lens group. No particular close-up (macro-photography) mechanism is needed.

However, the prior art zoom lens, in particular, such a zoom lens having large magnification change with zooming, has some difficulties in maintaining the optical performance perfectly. Aberrations cannot be corrected sufficiently by the focusing lens group. Especially in the focus position for near objects it is difficult to adequately correct the aberrations.

SUMMARY OF THE INVENTION

Accordingly it is a main object of the present invention to provide a zoom lens in which focusing can be achieved while maintaining the ideal optical performance over the whole range of from infinity to the shortest object distance.

It is another object of the invention to provide a zoom lens assembly comprising lens units so optically arranged that for focusing on near objects the lens unit which is the first one as viewed from the object side is moved toward the object side relative to the image plane while moving predetermined one or ones of the subsequent lens units toward the image side. For zooming, the first lens unit is moved along the optical axis while moving the determined subsequent lens unit or units also along the optical axis but in a determined amount of movement.

Other and further objects, features and advantages of the invention will appear more fully from the following description taken in connection with the accompanying drawings.

BRIEF DESCRIPTION OF THE DRAWINGS

FIG. 5A is an exploded view of the cam connection mechanism in the wide-angle position;

FIG. 5B is another exploded view of the cam connection mechanism in the telephoto position; and FIG. 6 is a sectional view of a zoom lens assembly showing another embodiment of the invention.

DESCRIPTION OF PREFERRED EMBODIMENTS

Figure 1:
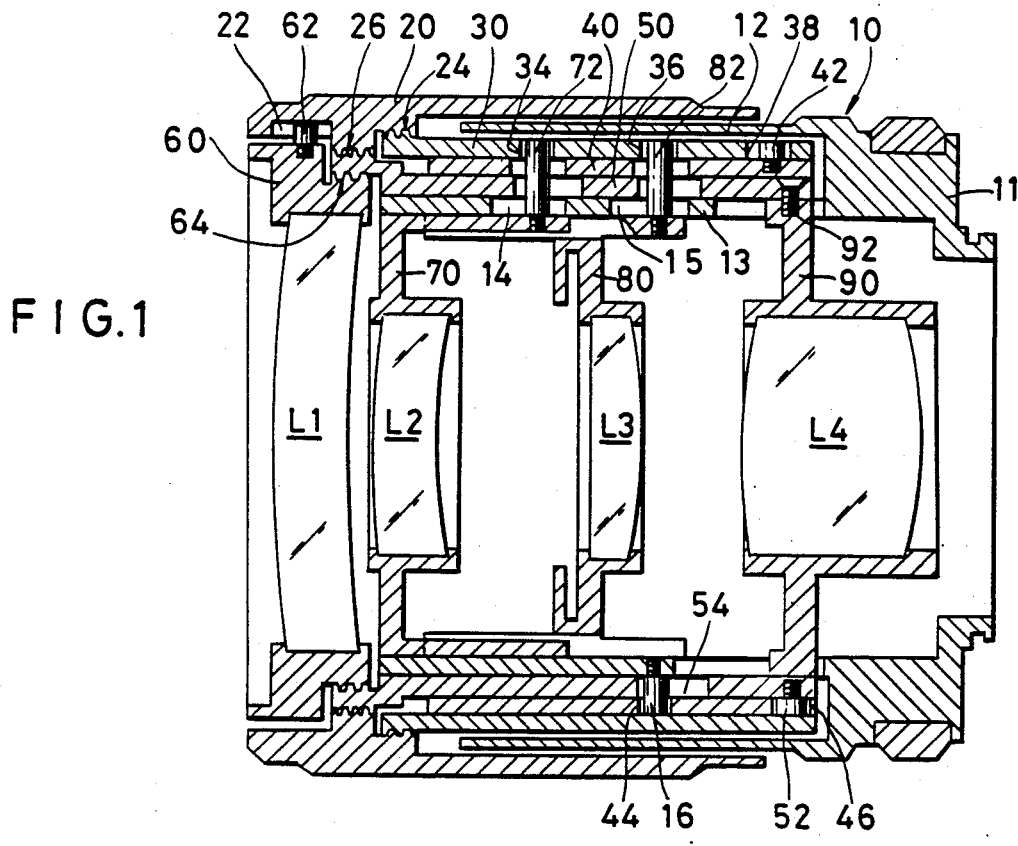
FIG. 1 is a sectional view of a zoom lens assembly showing an embodiment of the invention.

Referring first to FIG. 1 showing the first embodiment of the invention, the zoom lens assembly includes a zoom lens system comprising four lens units. They are, as viewed from the object side, the first lens unit with positive power L1, the second lens unit with negative power L2, the third lens unit with positive power L3 and the fourth lens unit with positive power L4. The first, second and third lens units constitute substantially an afocal system.

Figure 2:
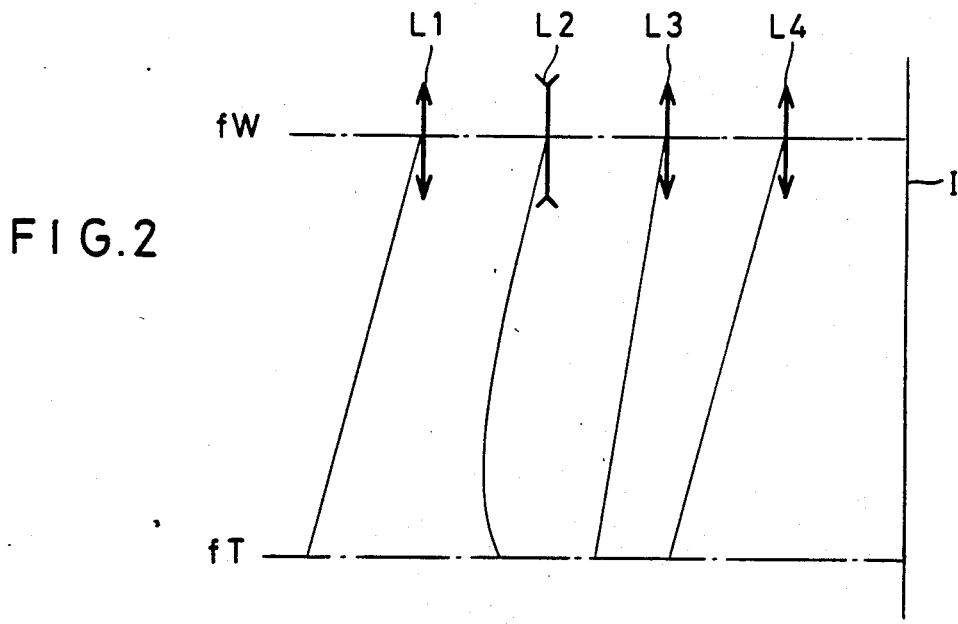
FIG. 2 illustrates the movements of the respective lens units of the zoom lens system for zooming.

In FIG. 2, fW denotes the wide angle end of the zoom range. fT is the telephoto end of the zoom range. When zooming from fW to fT, the first and fourth lens units L1 and L4 are moved toward the object side by nearly the same amount of movement. The third lens unit L3 is moved toward the object side in an amount of 4/10 to 8/10 of the movement of the first lens unit L1. The second lens unit L2 is moved toward the object side at least in the area near the wide angle end.

Figure 3:
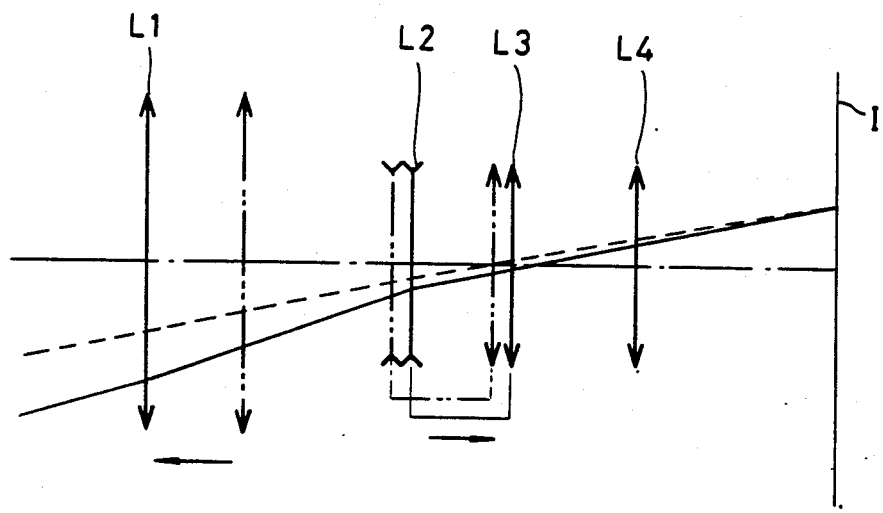
FIG. 3 illustrates the focusing method for the zoom lens system shown in FIG. 1.

When focusing on near objects, the first lens unit L1 is moved toward the object side along the optical axis relative to the image plane I while the second and third lens units L2 and L3 are together moved toward the image side as shown in FIG. 3. In FIG. 3, the principal ray of the oblique beam for focusing on objects at infinity is represented by a broken line and that for focusing on near objects by a solid line. The positions to which the first, second and third lens units L1, L2 and L3 are to be moved for focusing on objects at infinity are suggested by phantom lines, respectively.

Figure 4:
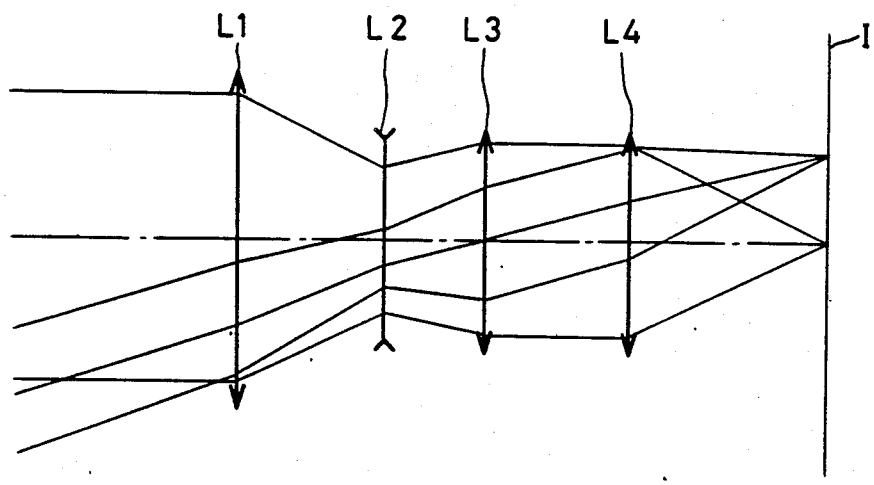
FIG. 4 illustrates the basic light path formed when the zoom lens system is in the position focused on an object at infinity.

FIG. 4 illustrates the marginal rays from the object point on-axis at infinity and from the object point off-axis at infinity when the lens is focused on objects at infinity.

Details of the optical arrangement of the above lens units have been described in the specification of U.S. patent application Ser. No. 626,989 filed on July 2, 1984.

The details of the lens assembly containing the above optical system L1-L4 will hereinafter be described with reference to FIG. 1.

The optical system is supported by a stationary cylinder or housing 10 extending in the direction along the optical axis from the base part 11. The stationary cylinder 10 comprises an outer cylinder 12 and an inner cylinder 13. An operation ring 20 is mounted on the stationary cylinder 10. Between the outer cylinder 12 and the inner cylinder 13 there are a cam ring 30, a first moving ring 40 and a second moving ring 50 fitted one on another successively.

The inner cylinder 13 has translational cam slots 14 and 15 extending in the direction of the optical axis. The operation ring 20 has a translational cam slot 22 formed on the inner wall surface at the object side end of the ring. At the end part on the object side the operation ring 20 is in engagement with the cam ring 30 through a thread 24 having a relatively large pitch. The cam ring 30 has spiral cam slots 34, 36 and an axial translation cam slot 38 formed in the middle part of the ring. Fitted in the translational cam slot 38 is a pin 42 fixed on the first moving ring 40 which further has a spiral cam slot 44 and a circumferential slot 46. Fitted in the cam slot 44 is a pin 16 fixed on the inner cylinder 13. The second moving ring 50 is in engagement with the operation ring 20 through a thread 26 having a relatively small pitch at the object side end. The ring 50 has a pin 52 fixed thereon and an axial translational slot 54. The pin 52 is engaged in the circumferential slot 46 on the ring 40. Fitted in the axial slot 54 is the pin 16 fixed on the inner cylinder 13.

A first lens holder 60 for holding the first lens unit L1 has a stud pin 62 engaged in the slot 22 on the operation ring 20. The first lens holder 60 is also in engagement with the second moving ring 50 through a thread 64 having a relatively large pitch. The second lens unit L2 and the third lens unit L3 are held by second and third lens holders 70 and 80, respectively. The second lens holder 70 has a stud pin 72 engaged in the translational cam slot 14 of the inner cylinder 13. The pin 72 further extends diametrically outwards into the spiral cam slot 34 of the cam ring 30 passing through openings formed in the rings 50 and 40. Similarly, the third lens holder 80 has a stud pin 82 engaged in the translational cam slot 15 of the inner cylinder 13. The pin 82 extends further diametrically outwards into the cam slot 36 of the cam ring 30 passing through openings formed in the rings 50 and 40. The fourth lens unit L4 is held by a fourth lens holder 90 which passes through an opening of the inner cylinder 13 and is fixed to the ring 50 by a screw 92.

With the above arrangement, the moving ring 50 is allowed to move in the axial direction only and can not rotate in the circumferential direction. On the contrary, the moving ring 40 can rotate in the circumferential direction but can not move in the axial direction relative to the ring 50. The ring 30 can be moved axially but it can not move rotationally relative to the ring 40 about the optical axis. Between the inner cylinder 13 and the moving ring 50 there is provided a suitable degree of frictional resistance.

The manner of operation of the above first embodiment is as follows:

In order to zoom the lens starting from the wide angle position shown in FIG. 1 and FIG. 5A, one slides the operation ring 20 toward the object side i.e. frontwards. With this slide movement of the operation ring 20, the cam ring 30, the first lens holder 60, the moving rings 50, 40 and the fourth lens holder 90 are also moved together by the same stroke frontwards (toward the object side) as indicated by the arrow in FIG. 5A. At this stage of movement, the ring 40 is rotated through the pin-slot engagement 16, 44 and also the cam ring 30 is rotated through the pin-slot engagement 42, 38 in the same direction and by the same rotational angle.

Consequently, the cam ring 30 moves rotationally relative to the operation ring 20 through the thread engagement 24 therebetween. As a result, the cam ring 30 is moved axially in a smaller amount of distance than that of the operation ring 20.

With the rotation of the cam ring 30, the second and third lens holders 70 and 80 are moved toward the object side along the optical axis through the pin-slot engagement 72, 34, 14 and the pin-slot engagement 82, 36, 15, respectively.

In this manner, zooming is performed and the zoom lens assembly is brought into the telephoto position as shown in FIG. 5B.

For focusing, one rotates the operation ring 20 about the optical axis. The rotation of the operation ring is transmitted to the first lens holder 60 through the pin-slot engagement 62, 22. Under the action of the thread engagement 64 between the first lens holder 60 and the moving ring 50, the first lens holder 60 and, therefore, the first lens unit L1 move in the direction of optical axis to effect focusing.

The rotation of the operation ring 20 for focusing never causes the rotation of rings 30, 40, 50. This is because the frictional resistance between the ring 50 and the inner cylinder 13 prevents the axial movement of the rings 50 and 40 and also the engagement of pin 16 and slot 44 serves to prevent the rotation of the ring 40 at this time. Therefore, the operation ring 20 moves axially by a certain number of pitches of the thread 26 corresponding to the amount of the rotational movement of the operating ring. The cam ring 30 moves axially a certain distance corresponding to the pitch difference between threads 24 and 26.

Consequently the second lens holder 70 carrying the second lens unit L2 and the third lens holder 80 carrying the third lens unit L3 are moved axially through the pin-slot engagement 72, 34, 14 and the pin-slot engagement 82, 36, 15, respectively. Thereby the separation between the third and fourth lens units L3 and L4 is reduced to correct aberrations for taking pictures of near objects.

A second embodiment of the invention is shown in FIG. 6.

In the second embodiment an additional translational slot 17 is formed in the inner cylinder of the stationary cylinder 110 in addition to the above-mentioned translational cam slots 14 and 15. The cam ring 130 has a cam slot 34 and the first moving ring 140 has cam slots 148 and 149. The second moving ring 150 is formed independently of the fourth lens holder 190. The third lens holder 180 has a stud pin 182 engaged in the translational slot 15 of the inner cylinder 13 and also in the cam slot 148 of the first moving ring 140. The fourth lens holder 190 has a stud pin 192 engaged in the translational slot 17 and also in the cam slot 149.

The manner of operation of the second embodiment is as follows:

When the operation ring 20 is slide-moved toward the object side for zooming, the cam ring 130 moves together with the ring 20 and also rotates through the pin-slot engagement 72, 34 at the same time. With the rotation of the cam ring 130, the ring 140 also rotates through the pin-slot engagement 42, 38. The rotation of the ring 140 causes the lens holders 70, 180 and 190 to move axially through the pin-slot engagements of 72, 34; 182, 148 and 192, 149, respectively. Thus, the second, third and fourth lens units L2, L3 and L4 are moved in the direction along the optical axis to perform zooming.

When the operation ring 20 is rotated for focusing, the first lens holder 60 is also rotated so that the first lens unit L1 is moved toward the object side. At the same time, the cam ring 130 moves toward the image side through the thread engagement with the operation ring 20 so that the second lens unit L2 is moved rearwards along the optical axis through the pin-slot engagement 72, 34. As a result of this, the separation between the second and third lens units L2 and L3 is decreased to correct aberrations for taking pictures of near objects.

While there have been shown and described particular embodiments of the invention, it is to be understood that the invention is not limited thereto but may be otherwise variously embodied within the scope of the following claims.

We claim:
1. A zoom lens assembly comprising:
 (a) an optical system containing lens units arranged on an optical axis;

(b) a stationary cylindrical housing member;

(c) an operation member movable relative to said housing member, said operation member being moved in the direction along the optical axis for zooming and being rotated about the optical axis for focusing;

(d) at least one lens holding means axially movable relative to said housing member and holding at least one of said lens units;

(e) a cam member mounted axially movable along the optical axis and rotatable about the optical axis relative to said housing member, said cam member being disposed between said operation member and said lens holding means and having a cam connection means so formed that when said cam member is rotated about the optical axis, said lens holding means is moved in the direction along the optical axis by said cam member and when said cam member is axially moved, said lens holding means is moved together with said cam member in the direction along the optical axis; and (f) means for interlocking said cam member to said operation member, said interlocking means rotating said cam member about the optical axis while moving said cam member in the direction along the optical axis during the time that said operation member is moved in the direction along the optical axis and moving said cam member in the direction along the optical axis during the time that said operation member is rotated about the optical axis.

2. A zoom lens assembly according to claim 1, wherein said optical system includes first, second and third lens units arranged in that order as viewed from the object side and said lens holding means includes lens holder members holding said second and third lens units, respectively.

3. A zoom lens assembly according to claim 2, which further comprises:

another lens holder member for holding the first lens unit, said another lens holder member being movable relative to said housing member in the direction along the optical axis; and means for connecting said another lens holder member and said operation member together in connection with the axial movement of said operation member.

4. A zoom lens assembly according to claim 3, which further comprises another interlocking means for moving said another lens holder member in the direction along the optical axis interlocking with the rotation of said operation member about the optical axis.

5. A zoom lens assembly according to claim 4, wherein said another interlocking means includes screw connection means provided between said operation member and said another lens holder member and means capable of moving said operation member and said another lens holder member relatively in the direction of the optical axis and for coupling these members for rotation as one unit around the optical axis.

6. A zoom lens assembly according to claim 1, wherein said interlocking means includes screw connection means provided between said operation member and said cam member, and a moving ring member rotatable together with said cam member about the optical axis and being moved in the direction along the optical axis together with said operation member and relative to said cam member.

7. A zoom lens assembly according to claim 6, wherein said interlocking means further includes another cam connection means provided between said housing member and said moving ring member for rotating said moving ring member about the optical axis during the time that said moving ring member is moved in the direction along the optical axis.

8. A zoom lens assembly comprising:

(a) an optical system including first, second and third lens units arranged in that order as viewed from the object side;

(b) a stationary cylindrical housing member;

(c) an operation member movable relative to said housing member, said operation member being moved axially along the optical axis for zooming and being rotated about the optical axis for focusing;

(d) first, second and third lens holding members for holding said first, second and third lens units, respectively, said lens holding members being movable in the direction along the optical axis independently of each other and relative to said housing member;

(e) first interlocking means for connecting said first holding member with said operation member to move said first holding member in the direction along the optical axis during the time that said operation member is rotated about the optical axis;

(f) a cam member mounted axially movable along the optical axis and rotatable about the optical axis relative to said housing member, said cam member being disposed between said operation member and each of said second and third lens holding members and having a cam connection means so formed that when said cam member is rotated about the optical axis, said second and third lens holding members are moved individually in the direction along the optical axis by said cam member and when said cam member is axially moved, said second and third lens holding members are moved together with said cam member in the direction along the optical axis; and (g) second interlocking means for connecting said cam member with said operation member to rotate said cam member about the optical axis while moving said cam member in the direction along the optical axis during the time that said operation member is moved in the direction along the optical axis and to move said cam member in the direction along the optical axis during the time that said operation member is rotated about the optical axis.

9. A zoom lens assembly according to claim 8, wherein said first interlocking means further moves said first holding member in the direction along the optical axis during the time that said operation member is moved axially along the optical axis.

10. A zoom lens assembly according to claim 8, wherein said first interlocking means includes screw connection means provided between said operation member and said first holding member and means capable of moving said operation member and said first holding member relatively in the direction of the optical axis and for coupling these members for rotation as one unit around the optical axis.

* * * * *